(12) United States Patent
Okabe et al.

(10) Patent No.: US 7,331,593 B2
(45) Date of Patent: Feb. 19, 2008

(54) MOTORCYCLE REAR FENDER STRUCTURE

(75) Inventors: Yasuhisa Okabe, Akashi (JP); Hideo Beppu, Ibaraki (JP); Yukinori Fujimoto, Kakogawa (JP); Katsuji Fujii, Tatsuno (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/510,191

(22) Filed: Aug. 25, 2006

(65) Prior Publication Data
US 2007/0045023 A1     Mar. 1, 2007

(30) Foreign Application Priority Data
Aug. 25, 2005   (JP)   ............... 2005-244510

(51) Int. Cl.
  *B62D 25/16*     (2006.01)
(52) U.S. Cl. .................... 280/152.3; 180/219
(58) Field of Classification Search ............. 280/152.1, 280/152.2, 152.3; 180/219; 362/473
See application file for complete search history.

(56) References Cited

U.S. PATENT DOCUMENTS

| 3,927,727 A * | 12/1975 | Hanagan ................ 180/219 |
| 6,257,362 B1 * | 7/2001 | Scherbarth ............... 180/219 |
| 6,318,743 B1 * | 11/2001 | Nakashima et al. ..... 280/152.1 |
| 6,520,275 B2 * | 2/2003 | Galbraith et al. .......... 180/219 |
| 6,695,330 B2 * | 2/2004 | Hata ...................... 280/152.3 |
| 7,036,837 B1 * | 5/2006 | Bauer et al. ............. 280/288.4 |
| 7,175,222 B2 * | 2/2007 | Gray et al. ................ 296/78.1 |

FOREIGN PATENT DOCUMENTS

JP      2004-224176      8/2004

\* cited by examiner

*Primary Examiner*—J. A Shriver (57) ABSTRACT

To provide a rear wheel fender structure for motorcycles, which can be molded with a simplified and inexpensive mold assembly even where the rear wheel finder is so designed and so structured as to permit component parts to be fitted thereto and as to block the splashing of water and/or mud, the rear wheel fender structure 27 is positioned above the motorcycle rear wheel 14 and includes an upper fender 39 and a lower fender 40 secured to a bottom region of the upper fender 39. An adiabatic space 99 is preferably formed between the upper fender 39 and the lower fender 40.

17 Claims, 10 Drawing Sheets

MOTORCYCLE REAR FENDER STRUCTURE

BACKGROUND OF THE INVENTION

1. Field of the Invention

The present invention relates to a motorcycle rear fender structure secured to a motorcycle frame structure above a motorcycle rear wheel.

2. Description of the Prior Art

In some of the motorcycles now in use, a rear frame substructure forming a rear portion of the motorcycle frame structure is generally provided with a rear wheel fender positioned above the rear drive wheel, a tail cover for covering an outer region of the rear frame substructure except for the position, where a driver's seat or a driver's seat and a fellow passenger's seat are installed, to provide an appealing appearance, and a storage space positioned below a fellow passenger's seat and including, for example, a glove box, a tool box and/or a casing for accommodating electric components. In general, the glove box and the tool box make use of the rear wheel fender as their bottom surfaces, of a top opening of the tail cover as an access opening and of the seat as a lid for those boxes. See, for example, the Japanese Laid-open Patent Publication No. 2004-224176, published Aug. 12, 2004.

In order to stably support various component parts of the motorcycle such as, a battery and/or an electronic control unit, the rear wheel fender is desired to have a bottom wall provided with fixing walls and hooks. Consequently, the rear wheel fender tends to take a relatively complicated rugged configuration and is generally manufactured as a resin molded article.

However, considering that the rear wheel fender is so shaped and so designed as to prevent water and/or mud, splashed from the motorcycle rear wheel, from entering an interior space inside the rear wheel fender, it is a general notion that the bottom wall of the rear wheel fender cannot have a design with perforations defined therein. Therefore, the rear wheel fender, when being manufactured by means of a plastic molding technique together with the fixing walls and hooks, must be molded with the use of a mold assembly having no shaped elements, which would leave mold holes in those portions of the molded product (i.e., the rear wheel fender) where such fixing walls and hooks are formed. In view of this, when it comes to the molding of the rear wheel fender, the use is considered essential of a two-piece mold assembly including upper and lower molds of a complicated shape having cores and sliders defined in each of the upper and lower molds. This does indeed lead to reduction of the productivity and increase of the manufacturing cost.

SUMMARY OF THE INVENTION

In view of the foregoing, the present invention has for its primary object to provide an improved rear wheel fender structure for motorcycles, which can be molded with a simplified and inexpensive mold assembly even where the rear wheel fender is so designed and so structured as to permit component parts to be fitted thereto and as to block the splashing of water and/or mud.

In order to accomplish the object of the present invention referred to above, the rear wheel fender structure of the present invention is positioned above the motorcycle rear wheel and includes an upper fender and a lower fender secured to a bottom region of the upper fender.

According to the present invention, the motorcycle wheel fender structure is of a double layered structure including the upper fender and the lower fender positioned below and secured to the upper fender. Accordingly, even though the upper fender has mold holes left therein to form fixing walls and hooks that are used to support and retain component parts, those mold holes left in the upper fender can be closed by the lower fender, thereby avoiding splashing of water and/mud from entering an interior space above the upper fender through the mold holes. Those upper and lower fenders can be manufactured by means of a plastic molding technique with the use of a simplified mold assembly including two separable and relatively movable molds, with the consequence that the productivity can be increased and the cost of manufacture of the mold assembly can also be reduced.

According to a preferred embodiment of the present invention, the upper fender and the lower fender may cooperatively define a space therebetween so that, even when the present invention is applied to a motorcycle of a kind, in which an exhaust muffler is disposed proximate to and below the motorcycle seat, radiant heat emitted from the exhaust muffler can be insulated by the space, delimited between the upper and lower fenders, to thereby preventing such radiant heat from being transmitted to the interior space in the upper fender. Accordingly, a possible exposure of component parts such as electric component parts disposed within the interior space can advantageously be suppressed.

The upper fender is preferably formed as a molded product, which is formed integrally with an upwardly protruding hook and which has a mold hole left below a free end of the hook. Where the upper fender is formed integrally with such upwardly protruding hook, not only can the upper fender be manufactured by means of a plastic molding technique with the use of, for example, a simplified molding assembly including relatively movable upper and lower molds, the hook can easily formed through the mold hole left therein.

In another preferred embodiment of the present invention, one of the upper fender and the lower fender may be provided with an engagement hole, in which case the other of the upper fender and the lower fender is provided with an engagement piece engageable in the engagement hole. According to this structural feature, since the lower fender can be fixed to the upper fender by means of a simplified coupling means for engaging the engagement piece in the engagement hole, the number of assembling steps can advantageously be reduced as compared with the coupling with the use of a coupling means such as screws or bolts and nuts.

Preferably, the upper fender has a bottom wall and side walls protruding upwardly from the bottom wall cooperatively delimiting an open-topped space and opening upwardly and is a molded product formed by a mold assembly including upper and lower molds separable from each other in a vertical direction. According to this structural feature, it is possible for the upper fender to be molded with the use of the simplified mold assembly made up of the relatively vertically separable upper and lower molds and, therefore, not only can the productivity be increased, but the cost of manufacture of the mold assembly can also be reduced.

In a further preferred embodiment of the present invention, the upper fender may be formed with a projection positioned inside the open-topped space and protruding upwardly from the bottom wall, which projection has a protruding tip having a substantially horizontally extending upper wall, while the bottom wall is formed with a mold hole at a position aligned with the upper wall. This enables the projection to be formed together with the upper fender with the use of the simplified mold assembly made up of the relatively separable upper and lower molds.

According to a still further preferred embodiment of the present invention, one of an outside of a side wall of the upper fender and the lower fender may be provided with an engagement hole, in which case the other of the outside of the side walls of the upper fender and the lower fender is provided with an engagement piece engageable in that engagement hole, such that the upper and lower fenders can be connected together through engagement between the engagement hole and the engagement piece. According to this structural feature, since the engagement hole is disposed outside the side walls that protrude upwardly, it is possible to avoid a possible ingress of water and/or mud from entering the open-topped space of the upper fender through the engagement hole.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A preferred embodiment of the present invention will be described in detail with reference to the accompanying drawings.

Figure 1:
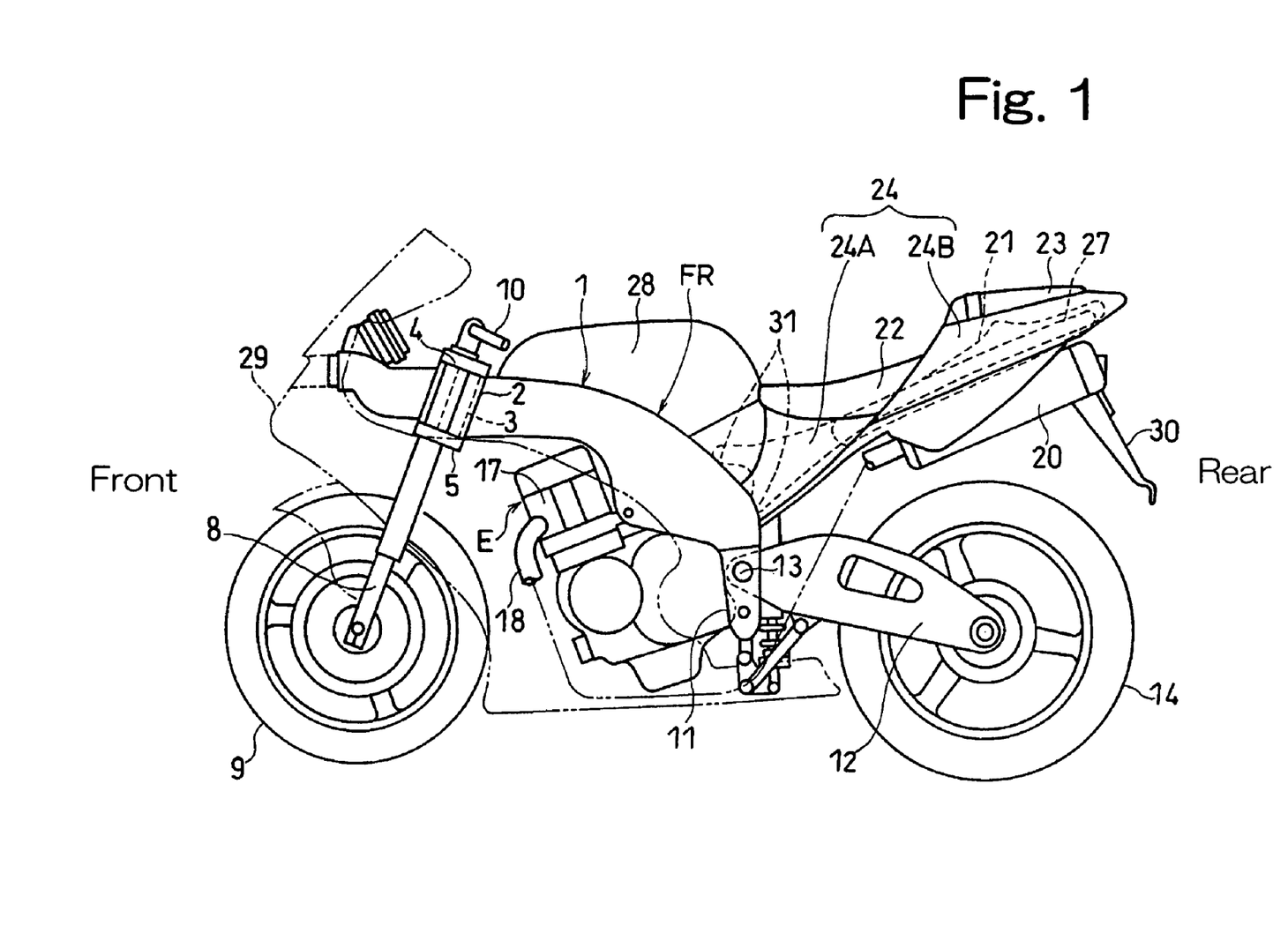
FIG. 1 is a schematic side view of a motorcycle equipped with a rear fender structure according to a preferred embodiment of the present invention.

FIG. 1 schematically illustrates a side view of a motorcycle equipped with a rear wheel fender structure according to the embodiment of the present invention. The motorcycle shown therein includes a motorcycle frame structure FR made up of a main frame 1, forming a front part of the motorcycle frame structure FR.

The main frame 1 includes a head tube 2 rigidly connected to a front portion of the main frame 1 and a steering shaft 3 is rotatably supported by the head tube 2. Upper and lower brackets 4 and 5 are supported by the head tube 2 through the steering shaft 3. Front fork members 8 are supported by the upper and lower brackets 4 and 5, and a front wheel 9 is rotatably supported by and between respective lower ends of the front fork members 8. A handlebar 10 is mounted on the upper bracket 4, which lies at respective upper ends of the front forks 8.

A swingarm bracket 11 is provided at a rear lower portion of the main frame 1, and a swingarm 12 is connected with the swingarm bracket 11 through a common pivot pin 13 for vertical swing movement. A rear drive wheel 14 is rotatably supported by respective rear ends of the swingarm 12. A multicylinder engine E is supported by the main frame 1 at a position below an intermediate portion of the main frame 1. This multicylinder engine E includes a cylinder head 17 having a plurality of exhaust pipes 18 fluidly connected therewith, which are in turn fluidly connected with mufflers 20 disposed on respective sides of a rear portion of the motorcycle frame structure FR.

A rear frame 21 connected to a rear portion of the main frame 1 forms a rear part of the motorcycle frame structure FR. A rider's seat 22 and a fellow passenger's seat 23 are mounted on the rear frame 21. This rear frame 21 also supports a rear fender structure 27 positioned above the rear drive wheel 14, the details of which will be described subsequently. A fuel tank 28 is mounted on the motorcycle frame structure FR at a location above the main frame 1 and between the handlebar 10 and the rider's seat 22. A front portion of the motorcycle frame structure FR is provided with a fairing 29, shown by the phantom line, which is so shaped and so positioned as to cover a front to side region of the motorcycle frame structure FR, including a front area forwardly of the handlebar 10 and side areas generally laterally of the motorcycle engine E.

Except for the areas of the rear frame 21, where the rider's seat 22 and the fellow passenger's seat 23 are disposed, opposite lateral areas of the rear frame 21 are covered by a front cover 24A and a rear cover 24B, which form respective parts of a tail covering 24. A wheel fender flap 30 is connected with a rear lower portion of the rear frame 21 so as to extend rearwardly downwardly therefrom.

Figure 2:
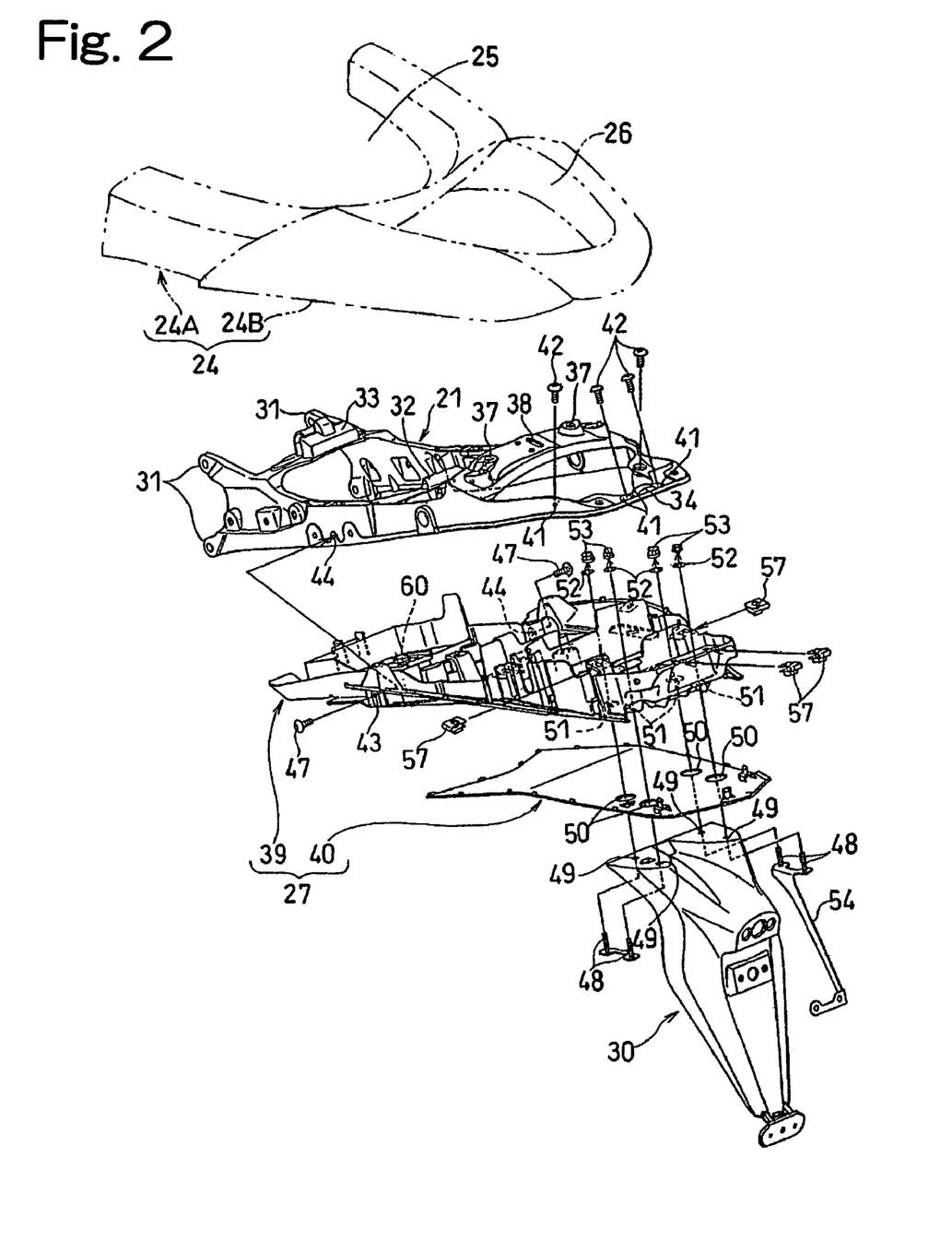
FIG. 2 is an exploded view showing important component parts of the rear fender structure shown in FIG. 1.

FIG. 2 illustrates a perspective exploded view showing the rear fender structure 27 shown in FIG. 1 and relevant parts thereof. The rear frame 21 is made of a metallic material such as an aluminum alloy and is formed in a generally rectangular frame-like shape, when viewed from top. This rear frame 21 is formed at its front end with a plurality of, for example, four (although only three of them are shown) connecting pieces 31 through which the rear frame 21 is rigidly connected with the main frame 1 (shown in FIG. 1) by means of corresponding screw members (not shown) so as to extend rearwardly from the main frame 1. This rear frame 21 is also formed with a front hook 32, with which an engagement pawl provided in the rider's seat 22 (shown in FIG. 1) is engaged, a connecting part 33, to which a connecting piece provided in the rider's seat 22 is secured by means of screws, a rear hook 34, with which an engagement pawl provided in the fellow passenger's seat 23 (also shown in FIG. 1) is engaged, a boss hole 37 for receiving therein an engagement projection of a positioning spindle of the fellow passenger's seat 23, and a slit-like elongated insertion hole 38 for receiving a to-be-locked piece of the fellow passenger's seat 23. The tail covering 24 includes the front and rear cover portions 24A and 24B, which have respective openings 25 and 26 defined therein so as to open upwardly, and is fixedly mounted on the rear frame 21 by means of a plurality of set screws (not shown).

The rear fender structure 27 is of a double layered structure including an upper fender 39, made of a synthetic resin, and a lower fender 40 made of a similar synthetic resin and connected to a lower region of the upper fender 39. The upper fender 39 is fixedly secured to the rear frame 21 by means of a plurality of, for example, four set screws 42 which are inserted through corresponding mounting holes 41, defined in a rear portion of the rear frame 21, and are then threaded firmly into associated clip-on nuts 57 then mounted on the upper fender 39. Also, this upper fender 39 has front left and right side walls fixedly secured to the rear frame 21 by means of fitting screws 47 inserted through corresponding mounting holes 43, defined in the upper fender 39, and then firmly threaded into screw holes 44 defined in the rear frame 21.

The rear fender flap 30 is fixedly connected with the rear fender structure 27 by passing left and right pairs of two mounting screws 48 successively through mounting holes 49 defined in the rear fender flap, insertion holes 50 defined in the lower fender 40 and fixing holes 51 defined in the upper fender 39, and fastening corresponding nuts 53 onto those mounting screws 48 with associated washers 52 intervening between them and the upper fender 39. When this rear flap 30 is connected with the rear fender structure 27, a reinforcement rib 54 is simultaneously secured to the rear fender flap 30.

Figure 3:
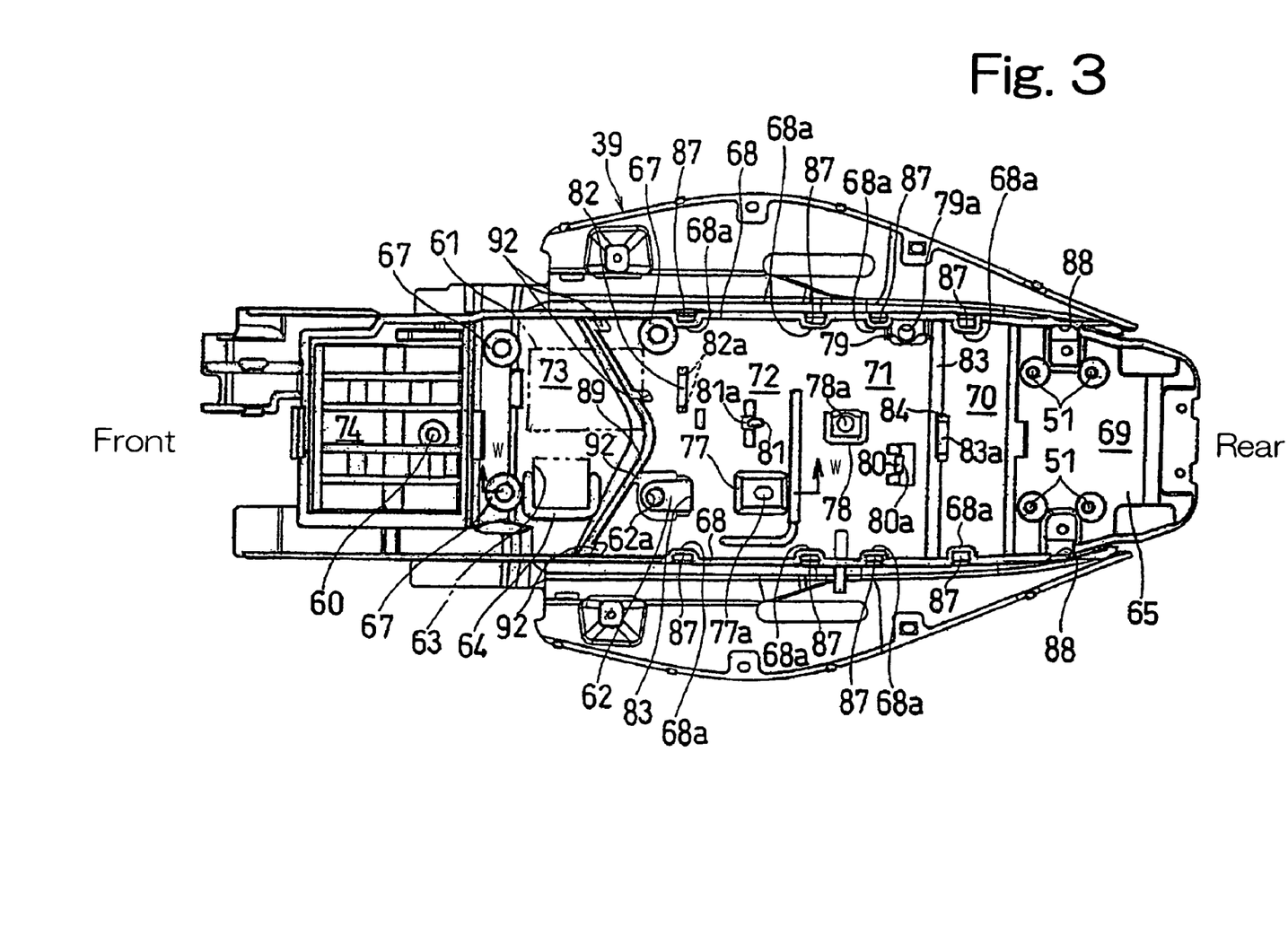
FIG. 3 is a top plan view of the rear fender structure shown in FIG. 1.
Figure 4:
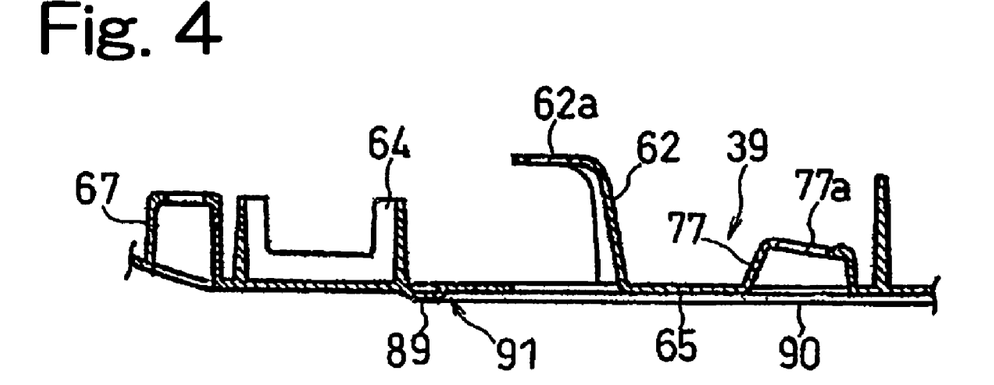
FIG. 4 is a fragmentary cross-sectional view, on an enlarged scale, taken along the line IV-IV in FIG. 3.
Figure 5:
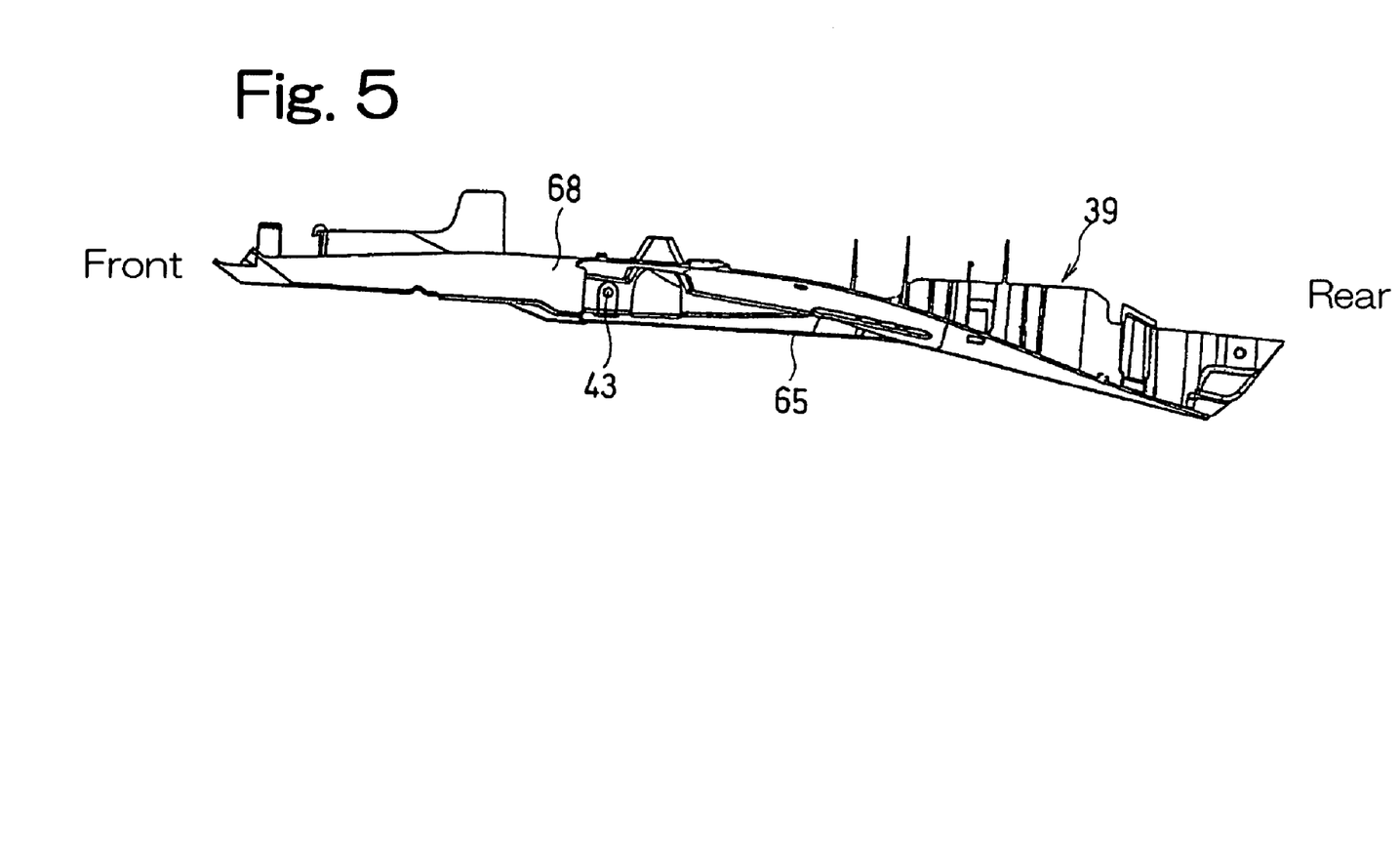
FIG. 5 is a side view showing an upper fender of the rear fender structure shown in FIG. 1.
Figure 6:
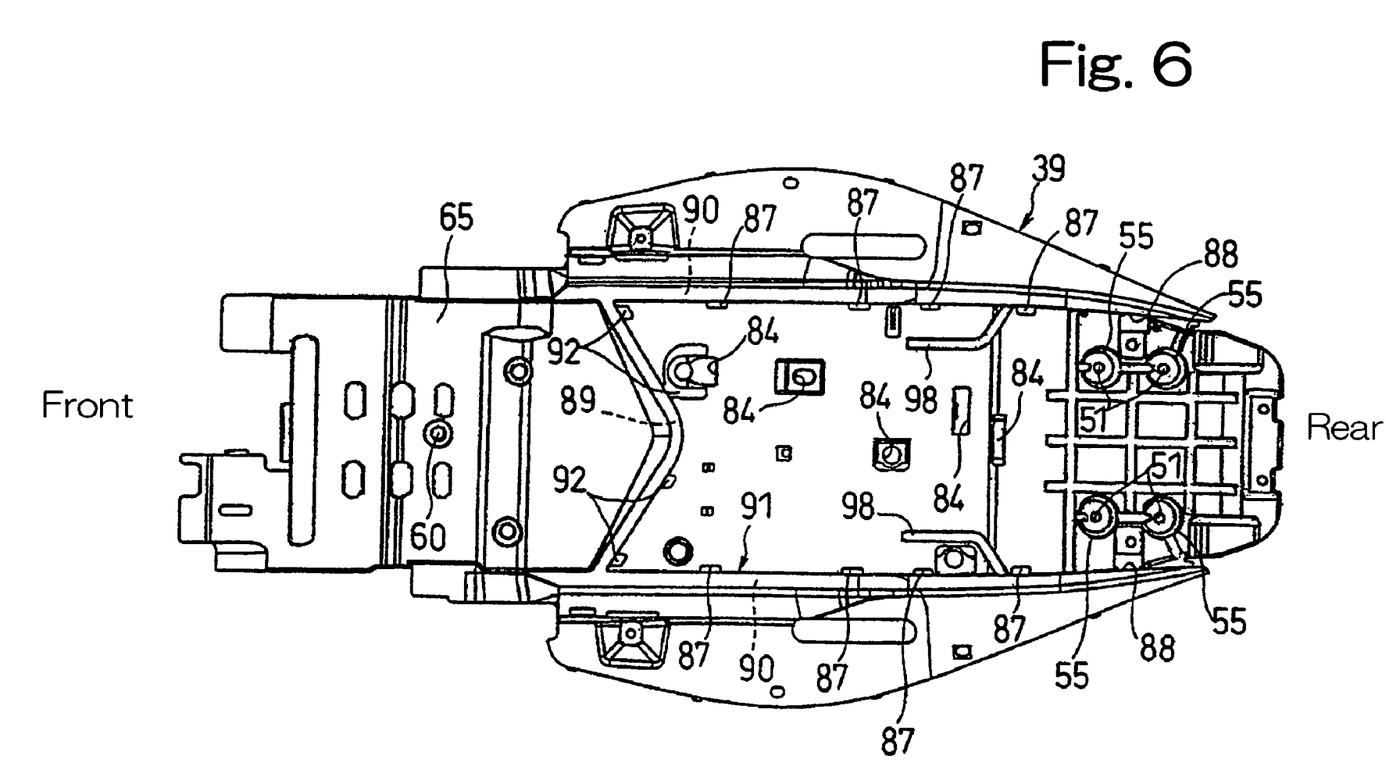
FIG. 6 is a bottom plan view showing the upper fender of the rear fender structure shown in FIG. 1.

FIG. 3 illustrates a top plan view, showing the upper fender 39; FIG. 4 illustrates a fragmentary cross-sectional view, on an enlarged scale, taken along the line IV-IV in FIG. 3; FIG. 5 illustrates a side view showing the upper fender 39; and FIG. 6 illustrates a bottom plan view showing the upper fender 39. Referring particularly to FIG. 3, the upper fender 39 is a molded product formed by the use of a plastic molding technique and includes a bottom wall 65 generally elongated in a direction conforming substantially to the longitudinal sense of the motorcycle frame structure FR and having its left and right side edges formed integrally with upwardly oriented side walls 68 lying generally perpendicular to the bottom wall 65 as best shown in FIG. 5. With the bottom and side walls 65 and 68 so formed, the upper fender 39 represents a configuration opening upwardly.

The upper fender 39 is assembled together with the rear frame 21 with the side walls 68 of the upper fender 39 disposed in contact with respective inner surfaces of left and right side wall of the rear frame 21 shown in FIG. 2. A rear half (the right half, in FIG. 2) of the rear frame 21 is covered with the rear cover portion 24B of the tail covering 24 shown in FIG. 1, which are fixed thereto by means of screw members (not shown). The rear cover portion 24B has a top opening 26 defined therein in an upper region thereof, and the fellow passenger's seat 23 is mounted on the rear cover portion 24B so as to close the top opening 26 of the rear cover portion 24B and is then fixed to the rear frame 21. Accordingly, an interior space is defined above the upper fender 39 with its top and sides covered by the rear cover portion 24B and the rear frame 21, respectively. The space is partitioned into a canister 69, a tool box 70 for accommodating tools, an actuator accommodating space 71 for accommodating an actuator for exhaust valves, a fuse box 72, an electronic control unit chamber 73 for accommodating a motorcycle electronic control unit 61 and a battery box 74, with the canister 69 and the battery box 74 positioned rearmost and front with respect to the direction of forward drive of the motorcycle.

The electronic control unit chamber 73 is formed integrally with a plurality of projections that are required to fix and retain the motorcycle electronic control unit (ECU) 61 in position within such chamber 73 without allowing component parts of the electronic control unit to rattle during the drive of the motorcycle. Specifically, the electronic control unit chamber 73 is formed with three bosses 67, a fixing wall 64 for a connection coupler 63 and a hook 62 for receiving an antitheft feature for the electronic control unit 61. Hence, the electronic control unit 61 is mounted on the upper fender 39 by means of a retaining member (not shown), fitted thereto through the three bosses 67 and a mounting hole 62a for the hook 62, in such a manner that the electronic control unit will not be easily removed out of the electronic control unit chamber 73.

Figure 7:
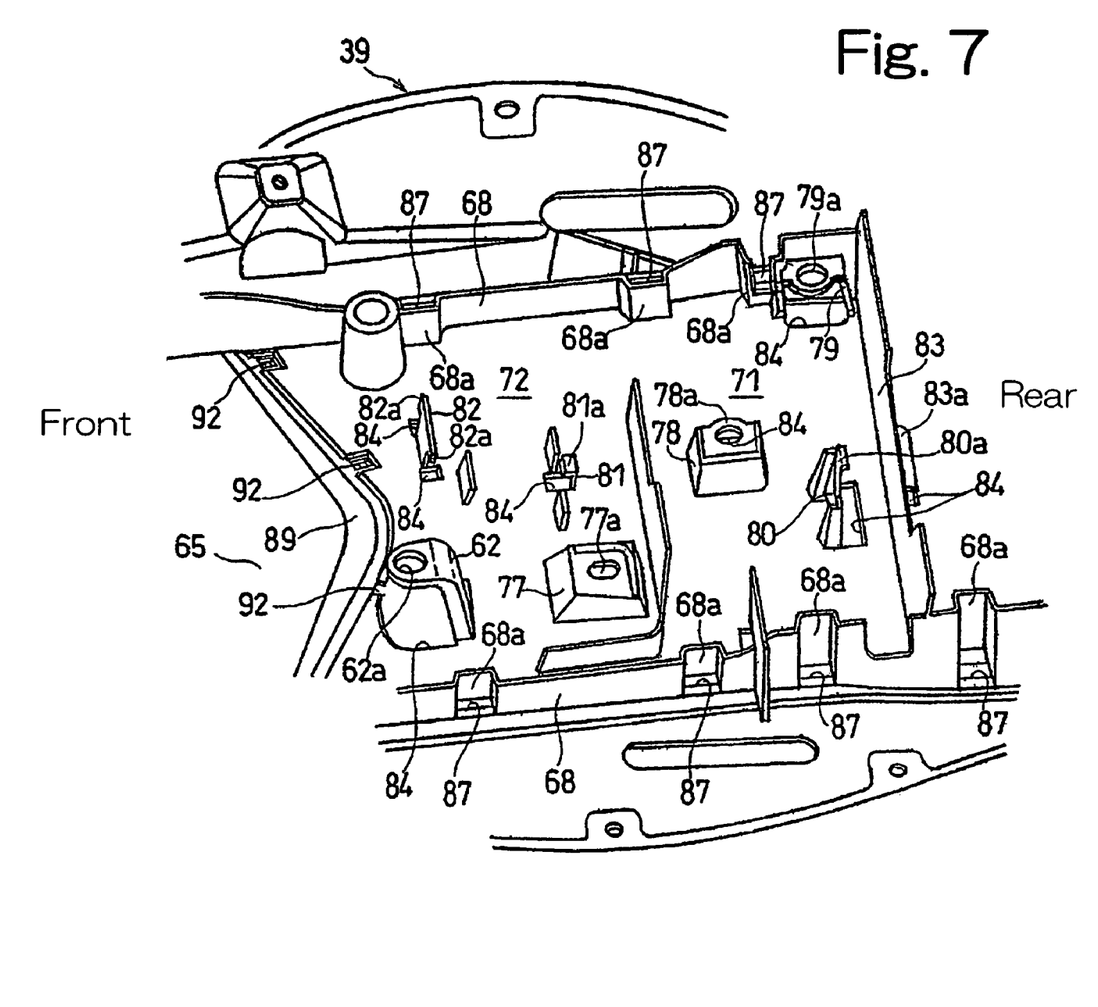
FIG. 7 is a fragmentary perspective view, showing a portion of the upper fender shown in FIG. 3 as viewed from top in a diagonally forward direction.

As best shown in FIG. 7, the upper fender 39 is formed with a plurality of fixing walls 77, 78 and 79 having respective fixing holes 77a, 78a and 79a defined in respective top walls thereof for fixing motorcycle mounted components such as, for example, electric component parts. Each of those fixing walls 77, 78 and 79 is made up of an upright wall protruding upwardly from the bottom wall 65 of the upper fender 39, with the respective top wall formed integrally with an upper edge of the associated upright wall. The upper fender 39 is also formed integrally with engagement elements 80, 81 and 82 having respective engagement pieces 80a, 81a and 82a protruding laterally therefrom, and an upright wall 83 having an engagement piece 83a protruding laterally from an upper edge thereof.

The generally elongated bottom wall 65 of the upper fender 39 is formed integrally with mold holes 84, which are left therein as a result of molding of the upper fender 39 in a shape complemental to correspondingly shaped elements in the mold assembly. Those mold holes 84 are left in those portions of the bottom wall 65 below a horizontally bent tip of the hook 62, in alignment with the fixing holes 77a, 78a and 79a in the fixing wall 77, 78 and 79, below the engagement pieces 80a, 81a and 82a of the engagement elements 80, 81 and 82, and below the engagement piece 83a of the upright wall 83.

Considering that the upper fender 39 including the bottom wall 65 and the side walls 68 molded together is open-topped as described hereinbefore, the upper fender 39 of the structure described above is accordingly formed by the use of a simplified mold assembly including upper and lower molds separable from each other in a vertical direction.

Each of the left and right side walls 68 has four recessed wall portions 68a defined therein so as to be depressed inwardly of the upper fender 39, that is, in a direction inwardly of the longitudinal axis of the motorcycle frame structure FR (Only three of the four recessed wall portions 68a defined in the right side wall 68 is shown in FIG. 7 for the purpose of convenience). Also, each of the opposite side edge portions of the bottom wall 65 laterally outwardly of the left and right side walls 68 with respect to the longitudinal axis of the motorcycle frame structure FR is formed with an engagement hole 87 extending completely across the thickness of the bottom wall 65 and positioned in alignment with a space bound by the respective recessed wall 68a. In addition to the four engagement holes 87 in each of the left and right side walls 68, an engagement hole 88 is defined in each of the left and right side walls 68 at a location in the vicinity of a rear end thereof as shown in FIG. 3, which engagement hole 88 concurrently serves as an insertion hole for the passage therethrough of a corresponding electric wiring cord, specifically an electric wiring cord for a respective rear lamp (not shown) mounted on the rear wheel fender flap 30 shown in FIG. 2.

As shown in FIG. 3, a front end portion of the upper fender 39 is formed with a front regulating recess 89 extending leftwards and rightwards in a shape conforming to the shape of a corresponding front end portion of the lower fender 40 (shown in FIG. 8) and also with longitudinally extending side regulating recesses 90 (also shown in FIG. 4) so as to communicate with left and right sides of the adjacent front regulating recess 89 and so shaped as to conform to the shape of left and right sides of the lower fender 40 (shown in FIG. 8). On the other hand, as shown in FIG. 6, the bottom wall 65 of the upper fender 39 has an undersurface formed with a positioning recess 91 for receiving the lower fender 40 in a predetermined relative arrangement through inner side edges of respective downwardly swelling portions of the regulating recesses 89 and 90.

The engagement holes 87 are formed in the bottom wall 65 at respective portions of the positioning recess 91 adjacent the left and right side regulating recesses 90. On the other hand, four engagement holes 92 are defined in respective locations in the positioning recesses 91 adjacent the front regulating recess 89. As clearly shown in FIG. 7, one of the four engagement holes 92 is formed so as to communicate with the mold hole 84 that is aligned with the hook 62. Also, as best shown in FIG. 6, the undersurface of the bottom wall 65 of the upper fender 39 is also formed with spacer pieces 98 downwardly protruding that are positioned on left and right side portions of the bottom wall adjacent a rear end thereof.

Figure 8A:
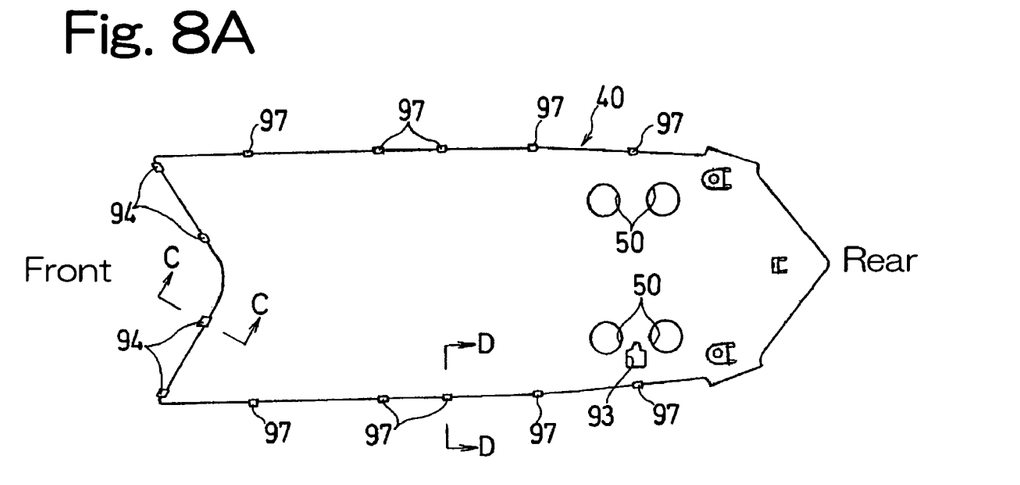
FIG. 8A is a top plan view of a lower fender of the rear fender structure shown in FIG. 1.
Figure 8B:
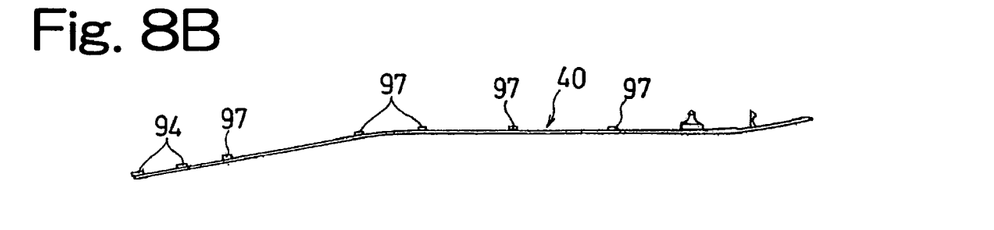
FIG. 8B is a side view of the lower fender.
Figure 8C:
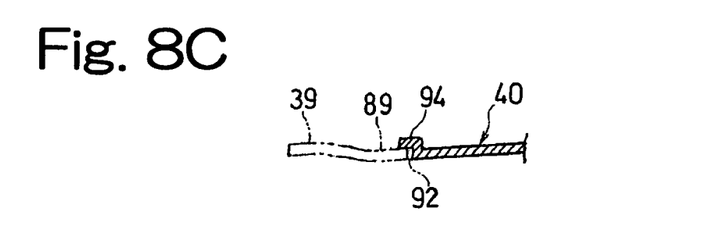
FIG. 8C is a fragmentary cross-sectional view, on an enlarged scale, taken along the line C-C in FIG. 8A, showing a portion of the lower fender.
Figure 8D:
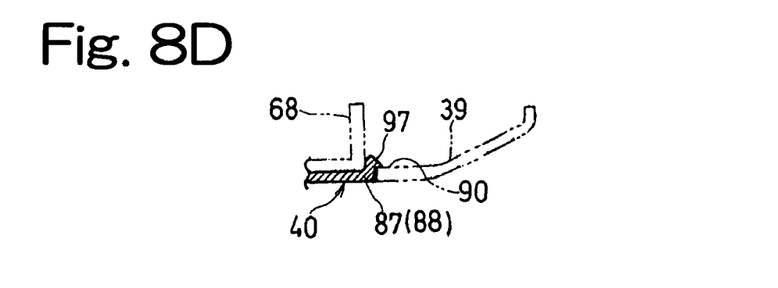
FIG. 8D is a fragmentary cross-sectional view, on an enlarged scale, taken along the line D-D in FIG. 8A, showing another portion of the lower fender.

FIGS. 8A to 8D illustrate the lower fender 40, in which FIG. 8A is a top plan view thereof, FIG. 8 is a side view thereof, FIG. 8c is a fragmentary cross-sectional view, on an enlarged scale, taken along the line C-C in FIG. 8A, and FIG. 8D is a fragmentary cross-sectional view, on an enlarged scale, taken along the line D-D in FIG. 8A. The lower fender 40 is generally in the form of a flat plate having a contour enough to allow it to be engaged in the positioning recess 91 defined in the upper fender 39 as hereinabove described. As best shown in FIG. 8A, this lower fender 40 is formed with four insertion holes 50 defined therein at respective locations, aligned with the fixing holes 51 defined in the upper fender 39. Those insertion holes 50 are, when the lower fender 40 is combined together with the upper fender 39, closed by corresponding bosses 55 where the respective fixing holes 51 in the upper fender 39 are defined.

The lower fender 40 is also formed with an insertion hole 93 at a portion thereof aligned with one of the engagement holes 88 defined in the upper fender 39 as shown in FIG. 8A. This lower fender 40 has a front end edge portion formed with four engagement pieces 94 so as to protrude upwardly as shown in FIG. 8C, which engage from below into the respective engagement holes 92 in the upper fender 39 and also has left and right side edge portions formed with respective pairs of five engagement pieces 97 so as to protrude upwardly, which engage from below into the respective engagement holes 87 and 88 in the upper fender 39 as best shown in FIG. 8D.

The engagement pieces 94 and 97 shown respectively in FIGS. 8C and 8D are in the form of a pawl integral with and extending outwardly from an outer peripheral edge of the lower fender 40 and, accordingly, even this lower fender 40 is formed with the use of the simplified and inexpensive mold assembly including upper and lower molds separable from each other in a vertical direction.

Figure 9A:
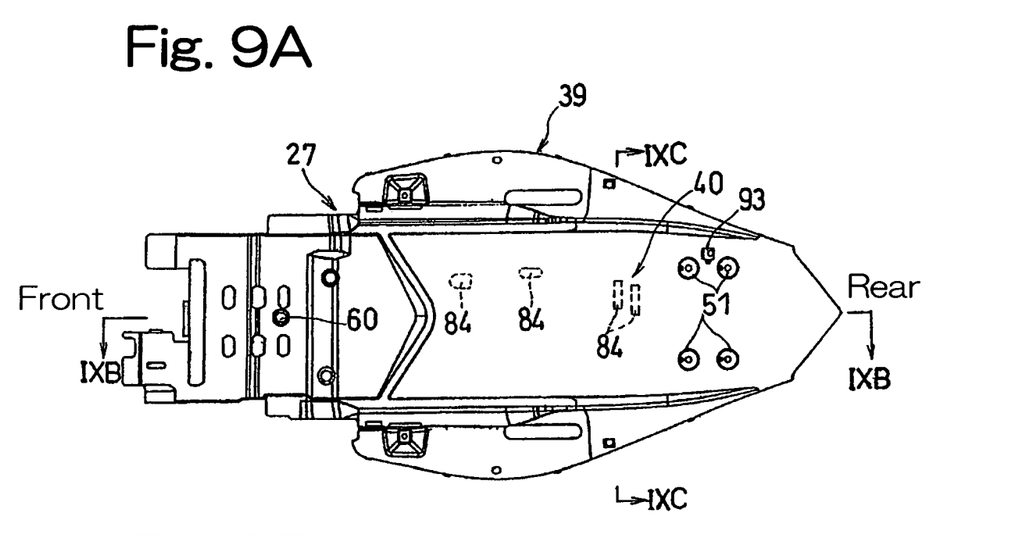
FIG. 9A is a bottom plan view of the rear fender structure shown in FIG. 1.
Figure 9B:
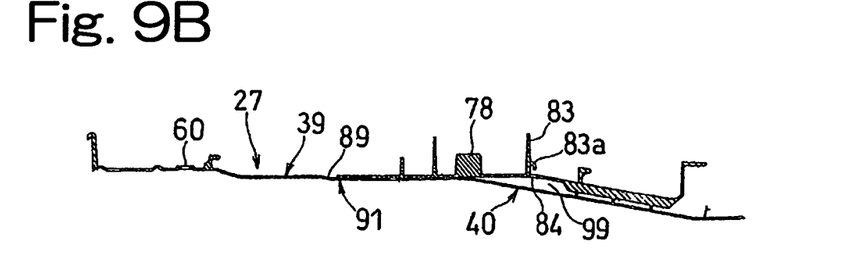
FIG. 9B is a fragmentary cross-sectional view, on an enlarged scale, taken along the line IXB-IXB in FIG. 9A, showing a portion of the rear fender structure.
Figure 9C:
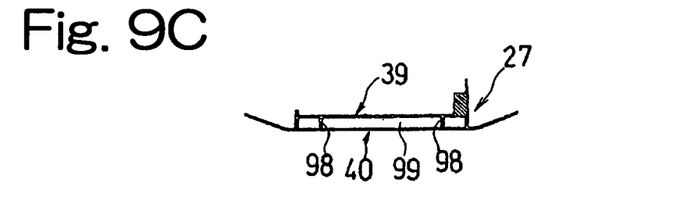
FIG. 9C is a fragmentary cross-sectional view, on an enlarged scale, taken along the line IXC-IXC in FIG. 9A, showing another portion of the lower fender.

FIGS. 9A, 9B and 9C illustrate the rear fender structure 27, in which the upper fender 39 is combined with the lower fender 40 positioned below the upper fender 39, in which FIG. 9A is a bottom plan view thereof, FIG. 9B is a fragmentary cross-sectional view, on an enlarged scale, taken along the line IXB-IXB in FIG. 9A, and FIG. 9C is a fragmentary cross-sectional view, on an enlarged scale, taken along the line IXC-IXC in FIG. 9A. As best shown in FIG. 9B, the lower fender 40 is engaged in the positioning recess 91 defined in the upper fender 39. At this time, as shown in FIGS. 8C and 8D, the four engagement pieces 94 in the front end portion of the lower fender 40 are engaged from below into the respective engagement holes 92 in the upper fender 39 and, at the same time, the left and right pairs of the five engagement pieces 97 are engaged from below into the associated engagement holes 87 and 88 in the upper fender 39. Accordingly, it will readily be seen that the lower fender 40 is connected from below with the upper fender 39 to thereby complete the rear fender structure 27 of the double layered structure as best shown in FIG. 9B.

It is to be noted that, as modified aspects of the foregoing embodiment, the engagement pieces 94 and 97 may be formed in the upper fender 30 and the engagement holes 87, 88 and 92 may correspondingly be formed in the lower fender 40. It is also to be noted that each of the upper and lower fenders 39 and 40 may be formed with respective combinations of engagement pieces and engagement holes.

In the assembled condition of the rear fender structure 27, shown in FIG. 2, of the above described construction, the mold holes 84 formed in the upper fender 39 as shown in FIG. 9A are closed by the lower fender 40 shown in FIG. 9B, and the left and right engagement holes 87 and 88 in the upper fender 39, shown in FIG. 3, are disposed laterally outwardly of the side walls 68. Accordingly, splashing of water and/or mud from the rear wheel 14 shown in FIG. 1 can be prevented from entering the interior space of the upper fender 39 through the mold holes 84, shown in FIG. 7, and the engagement holes 87 and 88.

Also, since the lower fender 40 is coupled with the upper fender 39 by means of simple coupling means, that is, engaging the engagement pieces 94 and 97, shown in FIGS. 8C and 8D, in the corresponding engagement holes 92, 87 and 88, the number of assembling steps can advantageously be reduced as compared with the coupling made by the use of screws or bolts and nuts.

Also, since the upper fender 39 is formed with the mold holes 84, which are required to form the fixing wall 64, shown in FIG. 3, and the fixing walls 77, 78 and 79 and the hook 62, both shown in FIG. 7, and were left therein as a result of molding of the upper fender 39, the upper fender 39 can be manufactured by means of any known plastic molding technique with the use of the simplified molding assembly including upper and lower mold halves. Accordingly, not only can the productivity be increased, but also the manufacturing cost can be reduced due to elimination of the need to use expensive cores and sliders.

As best shown in FIGS. 9B and 9C, an adiabatic space 99 is formed at a location adjacent the rear end of the rear fender structure 27, between the upper fender 39 and the lower fender 40 by the presence of the left and right spacer pieces 98 defined in the undersurface of the bottom wall 65 of the upper fender 39 and positioned on left and right side portions of the bottom wall 65 adjacent the rear end of the upper fender 39, which space 99 functions as follows.

Figure 10:
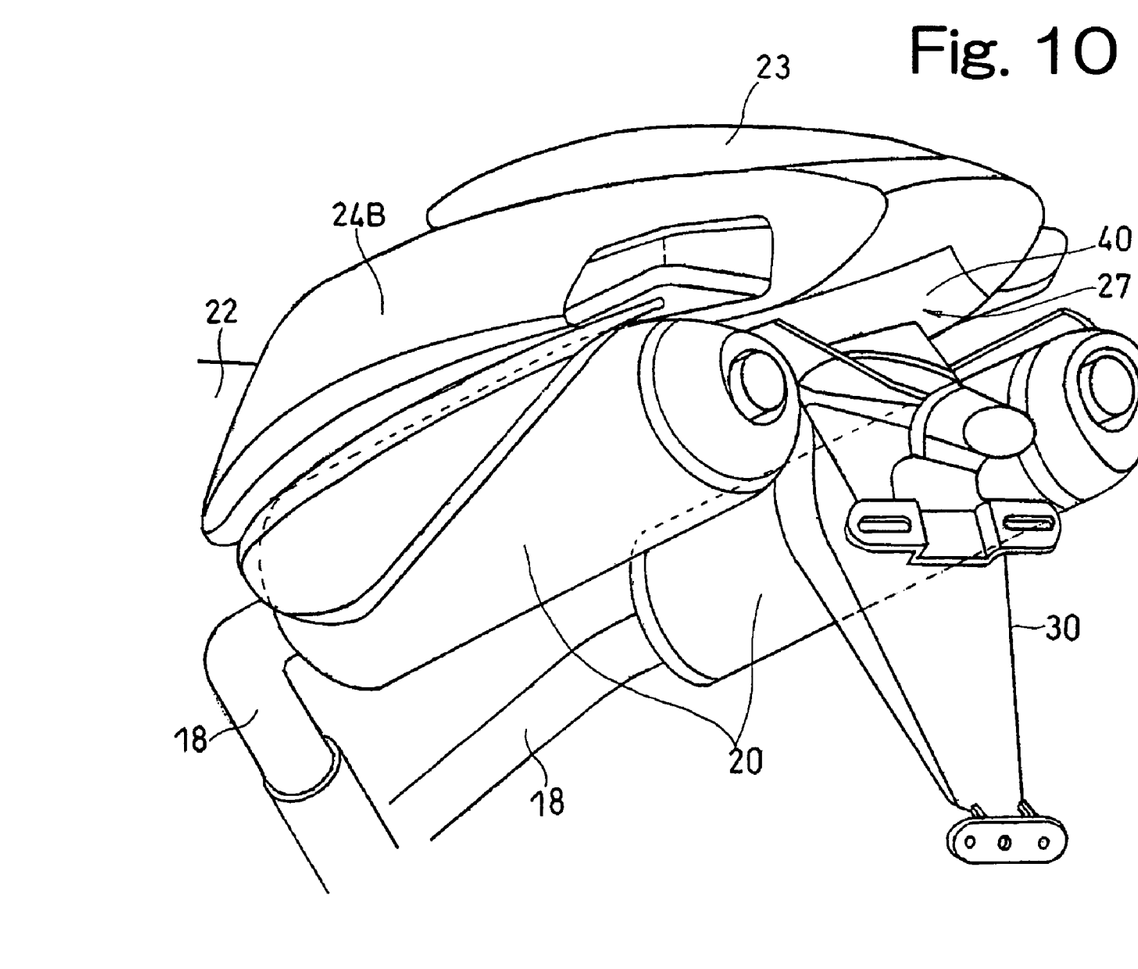
FIG. 10 is a perspective view of a rear end region of the motorcycle shown in FIG. 1 as viewed from rear in a diagonally upward direction.

Specifically in the illustrated embodiment, as shown in FIG. 10, the left and right exhaust muffler 20 are employed and positioned on the opposite sides of the rear fender structure 27 at respective locations proximate to and below the rear fender structure 27. In this type of motorcycle, heat dissipated from the left and right exhaust mufflers 20 is apt to be transmitted to the interior space bound by the rear fender structure 27 and the rear cover 24B.

In view of the above, in the rear fender structure 27 of the construction in accordance with the foregoing embodiment, the adiabatic space 99 is provided between the upper fender 39 and the lower fender 40 as shown in FIG. 9D to minimize or substantially suppress the transmission of that heat from the exhaust mufflers 20 to the interior space of the upper fender 39. This is particularly advantageous in that a possible heating of electric component parts of the electronic control unit 61 shown in FIG. 3 and disposed within the interior space of the rear fender structure 27 can be minimized or substantially eliminated.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A motorcycle rear fender structure positioned above a rear wheel of a motorcycle, which structure comprises;
   an upper fender having a bottom wall and a side wall protruding upwardly from the bottom wall cooperatively delimiting an open-topped space opening upwardly; and
   a lower fender connected to a lower region of the upper fender for covering a portion of or all of the bottom wall of the upper fender, from a lower side thereof.

2. The motorcycle rear fender structure as claimed in claim 1, wherein the bottom wall of the upper fender and the lower fender cooperatively define a space therebetween.

3. The motorcycle rear fender structure as claimed in claim 1, wherein the upper fender is a molded product formed integrally with an upwardly protruding hook and having a mold hole defined below a free end of the hook.

4. The motorcycle rear fender structure as claimed in claim 1, wherein one of the upper fender and the lower fender is provided with an engagement hole and the other of the upper fender and the lower fender is provided with an engagement piece engageable in the engagement hole.

5. The motorcycle rear fender structure as claimed in claim 1, wherein the upper fender is a molded product formed by a mold assembly including upper and lower molds separable from each other in a vertical direction.

6. The motorcycle rear fender structure as claimed in claim 5, wherein the upper fender is formed with a projection positioned inside the open-topped space and protruding upwardly from the bottom wall, which projection has a protruding tip having a substantially horizontally extending upper wall, and the bottom wall is formed with a mold hole at a position aligned with the upper wall.

7. The motorcycle rear fender structure as claimed in claim 4, wherein one of an outside of a side wall of the upper fender and the lower fender is provided with the engagement hole and the other of the outside of the side wall of the upper fender and the lower fender is provided with the engagement piece, the upper and lower fenders being connected together through engagement between the engagement hole and the engagement piece.

8. A motorcycle rear fender structure positioned above a rear wheel of a motorcycle, which structure comprises:
   a synthetic resin upper fender having a bottom wall and a side wall protruding upwardly from the bottom wall cooperatively delimiting an open-topped space opening upwardly; and
   a synthetic resin lower fender connected to a lower region of the upper fender for covering a portion of or all of the bottom wall of the upper fender from a lower side thereof and for providing a space therebetween, the upper fender having an integral first fastener engagement portion and the lower fender having an integral second fastener engagement portion complementary to the first fastener engagement portion for connecting the upper and lower fenders together;
   wherein the first fastener engagement portion is provided on an outside of a side wall of the upper fender, and one of the first and second fastener enganement portions is employed in the form of an engagement hole and the other of the fastener engagement portions is employed in the form of an engagement piece engageable in that engagement hole.

9. A motorcycle rear fender structure of claim 8 further including a rear fender flap connected to the upper fender with the lower fender interposed therebetween.

10. A motorcycle rear fender structure of claim 8 wherein the upper fender has an upper surface with a plurality of fixing walls for positioning electric component parts above the space between the upper fender and lower fender.

11. A motorcycle rear fender structure of claim 10 further including a metallic rear frame connected above and forming a space therebetween with the upper surface of the upper fender.

12. A motorcycle rear fender structure of claim 10 wherein the bottom wall of the upper fender has an undersurface formed with a front regulatory recess molded to conform to the left and right sides of the lower fender to enable a predetermined alignment of the upper and lower fenders when fixed together.

13. A motorcycle rear fender structure of claim 8 wherein one of the upper fender and lower fender has integral side engagement pieces and one of the upper fender and lower fender has complimentarily side engagement holes to receive the engagement pieces.

14. A motorcycle rear fender structure positioned above a rear wheel of a motorcycle, which structure comprises an upper fender and a lower fender connected to a lower region of the upper fender;
   wherein the upper fender is a molded product formed integrally with an upwardly protruding hook and having a mold hole defined below a free end of the hook.

15. A motorcycle rear fender structure positioned above a rear wheel of a motorcycle, which structure comprises an upper fender and a lower fender connected to a lower region of the upper fender;
  wherein the upper fender has a bottom wall and a side wall protruding upwardly from the bottom wall cooperatively delimiting an open-topped space opening upwardly, and is a molded product formed by a mold assembly including upper and lower molds separable from each other in a vertical direction; and
  wherein the upper fender is formed with a projection positioned inside the open-topped space and protruding upwardly from the bottom wall, which projection has a protruding tip having a substantially horizontally extending upper wall, and the bottom wall is formed with a mold hole at a position aligned with the upper wall.

16. A motorcycle rear fender structure of claim 9 further including an L-shaped reinforcement rib for supporting the rear fender flap.

17. A motorcycle rear fender structure of claim 11 wherein the metallic rear frame is a formed aluminum alloy member of a generally rectangular frame shape when viewed from above.

* * * * *